Aug. 26, 1930.   H. SCHNEIDER   1,773,794
STEERING DEVICE FOR MOTOR VEHICLES
Filed Nov. 24, 1928   3 Sheets-Sheet 2

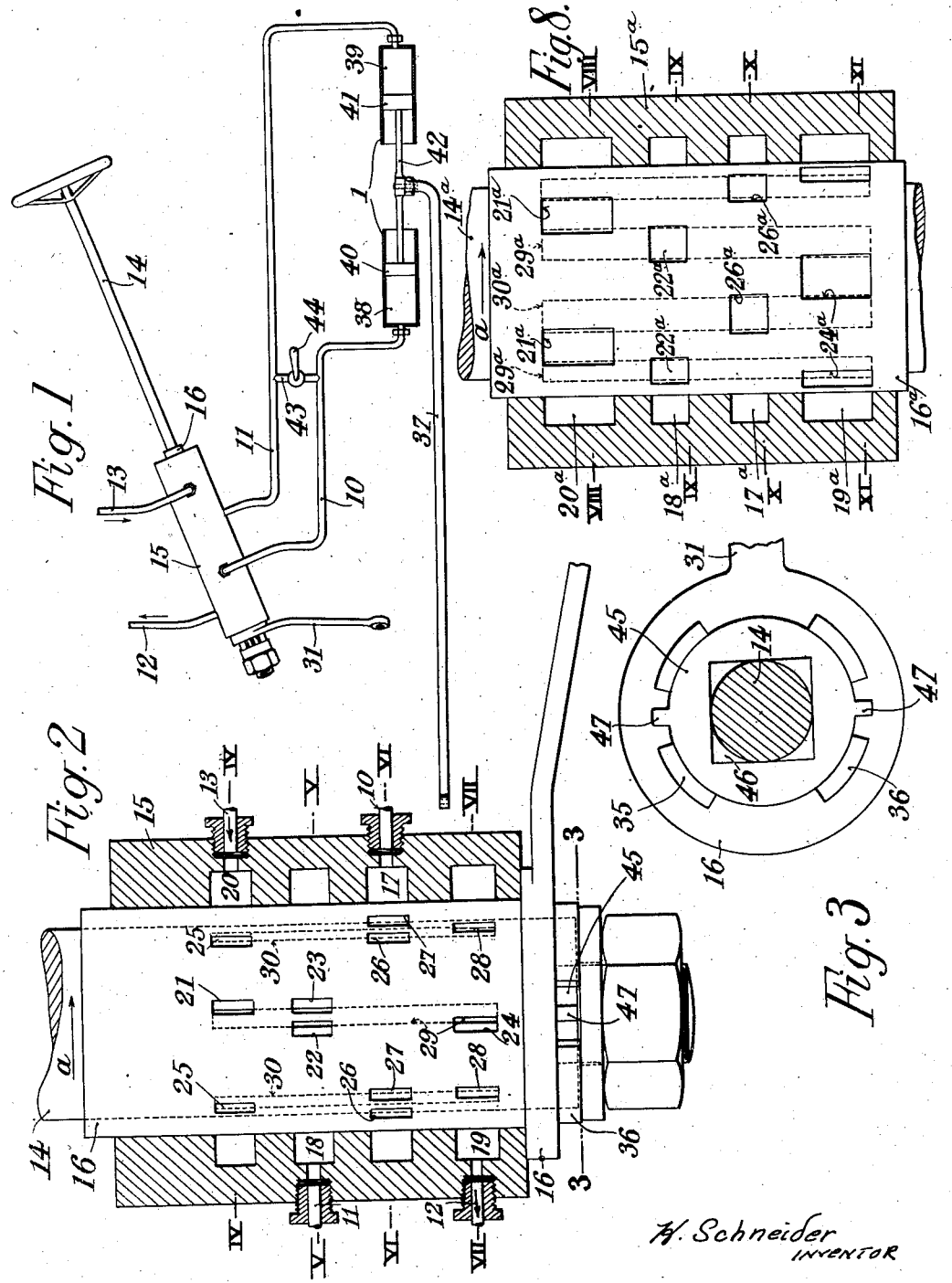

Fig.1a

H. Schneider
INVENTOR by: Marks & Clerk
ATTYS.

Aug. 26, 1930.  H. SCHNEIDER  1,773,794
STEERING DEVICE FOR MOTOR VEHICLES
Filed Nov. 24, 1928  3 Sheets-Sheet 3
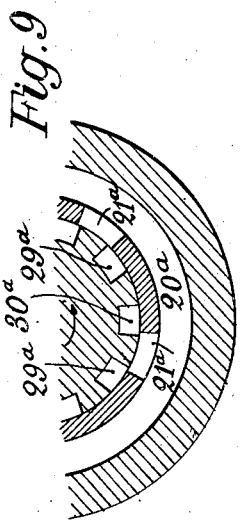
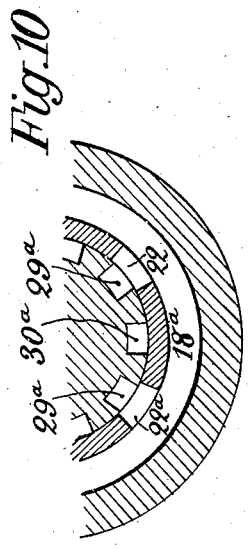
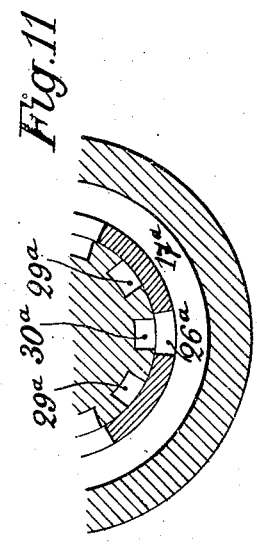
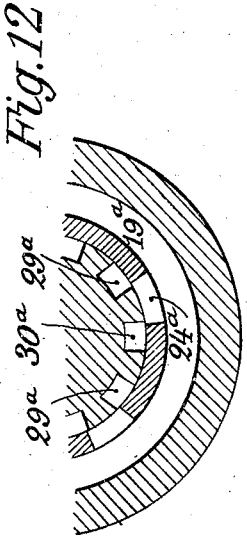
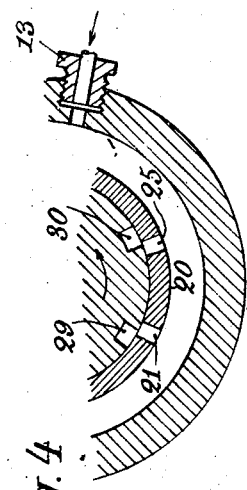
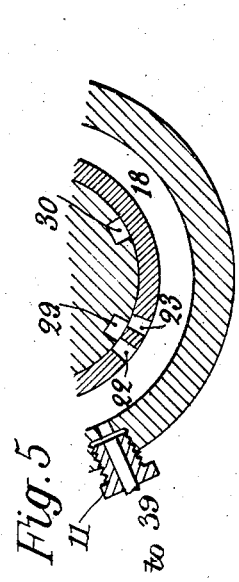
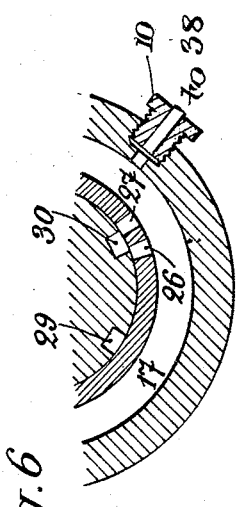
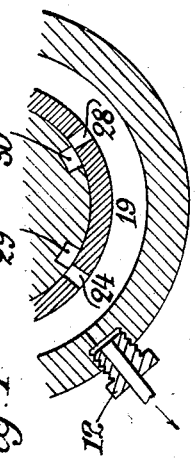
H. Schneider
INVENTOR
By: Marks & Clark
Attys.

Patented Aug. 26, 1930

1,773,794

UNITED STATES PATENT OFFICE

HANS SCHNEIDER, OF PARIS, FRANCE

STEERING DEVICE FOR MOTOR VEHICLES

Application filed November 24, 1928, Serial No. 321,745, and in France January 21, 1928.

Known devices for the steering of motor vehicles comprise a hydraulic servo-motor actuated by a liquid placed under pressure in a suitable tank by a pump, and under the control of a distributing device mounted on the steering shaft.

The present invention relates to a construction of this class in which I considerably reduce the angular motion required for the steering wheel to obtain a given degree of steering, and which affords steering gear which is very accurate and responsive, avoiding all hard friction, and it is unaffected by the reactions of the wheels.

For this purpose, the channels are normally partially open for the continuous flow of the fluid, and according as the steering wheel is turned in one or the other direction, this fluid will act only upon one of the faces of the piston, and which displaces the piston until, after the steering has been effected, the fluid again passes through the partly opened channels without acting upon the piston.

I may eliminate the tank for the pressure fluid, and may use the lubricating oil of the crankcase, preferably delivered by the oil pump, and the oil passes first through the distributor and proceeds thence to the engine.

The appended drawings show by way of example two embodiments of the invention.

Figs. 1 to 3 relate to one embodiment.

Fig. 1 is a general diagrammatic elevational side view of the device.

Fig. 1ª is a plan view.

Fig. 2 is a sectional view of the distributor.

Fig. 3 is a section on the line III—III of Fig. 2, seen from the bottom.

Figs. 4 to 7 are partial sections on the lines IV—IV to VII—VII of Fig. 2, respectively.

Fig. 8 is a view analogous to Fig. 2, relating to a second embodiment.

Figs. 9 to 12 are partial cross-sections on the lines IX—IX to XII—XII of Fig. 8, respectively.

As shown in Figs. 1 to 3 the cylinder 1 is mounted on the vehicle frame and preferably along the foot board, on the same side as the steering gear. The said cylinder comprises two parts 38—39 cooperating with the respective pistons 40—41, connected together by a rod 42 which is connected by a link 37 to an arm 4 secured to the journal of the front wheel which is situated on that side by example to the left wheel.

A distributor for liquid is disposed on the steering shaft 14, and it is connected at one end to the two parts of the cylinder 1 by conduits 10—11, and at the other end to the oil pump by a delivery conduit 13 and a return conduit 12.

The said distributor comprises a fixed sleeve 15 in which is rotatable a socket 16 adjusted on the rod 14 and connected by an arm 31 and a link 32 to the journal of the other front wheel it is to say the right wheel in the present case. The said sleeve comprises four grooves 17—18—19—20 communicating with the respective conduits 10—11—12—13. The said socket is pierced with ports corresponding to said grooves, for instance 21—22—23—24—25—26—27—28.

On the steering shaft 14, and adjacent the distributor, are formed the six grooves such as 29 and 30, which are deep and narrow. The ports 22—23—26—27 are somewhat narrower than the grooves, and two consecutive ports situated in a given perpendicular section of the distributer, such as 22—23 or 26—27, are spaced apart by a distance which is less than the width of a groove. The spacing and width of the ports 21—25—24—28 are such that these ports can partly uncover the channels 29—30 at the same time. Hence, in the closed position of the distributor (Fig. 2) all the passages for the fluid are partly open, and due to the total sum of their cross sections, the fluid has a free circulation.

When the steering wheel is slightly turned, the grooves 29—30 will move relatively to the ports 21 to 28, so that the passages will be restricted (or closed) on one side and will be increased in section on the other.

For instance, if the shaft 14 is turned in the direction of the arrow a, Fig. 2, with reference to the socket 16, it is to say if the hand wheel is turned on the left side, the ports 21—22—26—28 will be further opened while the ports 25—23—27—24 will be closed, so that the pressure fluid delivered through the conduit 13 will not circulate in the channels 30, but will only pass through the channels 29, the ports 23, the groove 18, and the conduit 11, to the piston 41. On the contrary, the fluid in the cylinder 38 can escape through 10—17—27—30—28—19—12, so that the pair of pistons 40—41 will move to the left (Fig. 1) and can thus act on the steering gear through 37 and 4, for turning the wheels on the left side.

According as the vehicle wheels are turned about they oblige (by 32—21) the socket 16 to turn in the direction of the arrow $a$ (Fig. 2), so that if the driver should continue to turn his wheel in this direction, the ports and channels will preserve their relative position, and the vehicle wheels will continue to turn about. When the driver ceases to turn his wheel or brings it slightly back, a small rotation of the socket 16, still according to the arrow, will partly close the opened ports and will uncover the others, thus again offering the same pressure on the pistons 40—41. The vehicle wheels will remain in their position until the driver turns his wheel to a greater extent and contrary to the arrow $a$, so as to open to a greater degree the ports 25—23—27—24 and to close the ports 21—22—26—28, and thus the pressure fluid is delivered through the channels

13—25—30—26—10 to the piston 40, also connecting the piston with the exhaust through 11—22—29—24—12 whereby the vehicle wheels will be turned about in the contrary direction.

A very slight movement of the steering wheel will suffice to cause a great variation of the flow sections in the distributor, since the ports are closed on one side while they are opened on the other side, and thus the apparatus is very responsive.

The diameter of the cylinder 1 is determined according to the output of the pump in such manner as to obtain the proper speed for the steering.

The two conduits 10 and 11 connecting the distributer to the cylinders 38—39 are connected together by a by-pass 43 normally closed by a cock 44. When the said cock is opened, the oil no longer acts upon the pistons, whatever may be the position of the steering wheel, and at the same time, the oil offers no resistance to the steering by hand.

The cock 44 may be controlled by a handle (not shown) which may be placed under the steering wheel or upon the instrument board.

I may also employ a safety valve which acts when the steering of the wheels is prevented, so that the pressure of the fluid will not attain a dangerous value. However, the said valve must open only at a high pressure, and it will not act during the normal operation.

The rotation of the steering wheel relatively to the socket 16 is limited by the abutments 35—36 mounted on the socket 16 and the studs 47 on the steering shaft 14. For this purpose, the washer 45 is fitted upon a square end of the rod 14 and carries the studs 47 cooperating with said abutments (Fig. 3).

The said apparatus is sufficiently powerful to turn the vehicle wheels instantly on the spot, when the vehicle is stopped and the steering wheel is in any position. The sum of the oil flow sections is never less than the sections offered when the steering wheel is at the dead center.

I may increase the circulation capacity of the distributer without reducing its responsiveness, by increasing the length of the ports. Also, the said ports need not have the same length, and it may be preferable to make the admission and discharge ports longer than the ports connecting the distributer to the cylinder 1.

With my said device, the wheels can be steered by $\frac{1}{3}$ revolution of the steering wheel, whereas at the present time several revolutions are required.

By the construction shown in Fig. 8, I am enabled to reduce the height of the distributer or to increase its output without increase of size. For this purpose, the socket ports cooperating with the cylinders have such size and position that they will always remain open during all motion of the steering shaft used in practice. However, the ports corresponding to the oil delivery and discharge pipes are alternately closed, slightly opened, or opened.

In these conditions, the first ports need not be very high, since they are always open, and this allows of reducing the size of the distributer.

In the steering shaft $14^a$ are formed for instance ten longitudinal slots $29^a$—$30^a$, regularly spaced, whose width is such that the distance between any two adjacent slots is practically equal to this width. In the socket $16^a$, and adjacent each groove of the sleeve $15^a$ are formed five ports having the same respective height as the said grooves, and a somewhat greater width than the slots.

When the steering shaft and the socket are at the dead center, the said ports have the position shown in the figure. The ports $22^a$—$26^a$ cooperating with the grooves $17^a$—$18^a$ and connecting the distributer to the cylinders, are entirely open, even when the steering wheel is turned within practical limits; said ports are somewhat larger than the slots, and a slight motion of the slots will not reduce their section.

The said ports need not be very high, since they are at all times entirely open. Their height may be reduced, without inconvenience, to about $\frac{1}{3}$ the height of the ports $21^a$—$25^a$—$24^a$—$28^a$, corresponding to the admission and discharge of the pump liquid. These last-mentioned ports are exactly in line with the spaces between the slots 29ª—30ª, and since they are wider than these spaces, they are in normal conditions slightly open on both sides.

When the steering wheel is turned to the left, in the direction of the arrow $a$, Fig. 8, the five slots 29ª will connect the five ports 21ª adjacent the groove 20ª with the five ports 22ª adjacent the groove 18ª, and the other five slots 30ª will connect the ports 26ª, adjacent the groove 17ª, with the ports 24ª adjacent the groove 19ª.

When the steering wheel is turned to the right, the five slots 30ª will connect the ports of the groove 20ª to the ports of the groove 17ª, and the other slots 29ª will connect the ports of the groove 18ª with the ports of the groove 19ª.

At the dead center, the pressure fluid is supplied through the five ports 21ª, proceeds through the ten slots, and is discharged through the five slots 24ª.

Thus during the normal operation the fluid circulates through the distributer without acting on the piston, and with the minimum friction, since the distributer offers little or no resistance to the flow of the oil. The fluid supplied on one or the other side of the servo-motor pistons will at once attain the necessary pressure when the steering wheel is turned.

I claim:

In a distributor for compressed fluid for use upon steering devices of motor vehicles and adapted to be inserted in a piping for continuous circulation of compressed fluid, the combination of an outer fixed sleeve in the inner wall of which are provided four circular grooves, a first groove being connected to the inlet of the compressed fluid, a second groove being connected to the outlet of the fluid, a cylinder, a double-acting piston in said cylinder, this piston being connected to the front wheels of the vehicle, one face of the said piston being in communication with the third groove and the other face of the said piston being in communication with the fourth groove of the said sleeve, a socket adapted to rotate with smooth friction in said sleeve and in which are provided two groups of ports at the height of each groove, means for connecting said socket to the front wheels of the vehicle, a rod adapted to rotate with smooth friction in said socket and in which are provided two groups of longitudinal grooves, said rod being connected to the steering hand wheel, one group of the said longitudinal grooves being placed for communicating with the first, the third and the fourth circular groove and the other group being placed for communicating with the first, the second and the fourth circular groove through the corresponding ports, the said ports being adapted to be half opened in the middle position of the distributor and the ports of one group being opened when the ports of the other group are closed.

In testimony whereof I have hereunto affixed my signature.

HANS SCHNEIDER.